United States Patent [19]

Pianka

[11] 3,728,458
[45] Apr. 17, 1973

[54] METHODS OF CONTROLLING NEMATODES USING 2-BUTYL-4,6-DINITRO-PHENOL CARBOXYLIC ESTERS

[75] Inventor: Max Pianka, St. Albans, England

[73] Assignee: The Murphy Chemical Company Limited, St. Albans, England

[22] Filed: July 24, 1969

[21] Appl. No.: 844,638

[30] Foreign Application Priority Data

July 25, 1968 Great Britain.....................35,589/68

[52] U.S. Cl. ..................424/311, 424/248, 424/266, 424/312, 424/313, 424/314
[51] Int. Cl. ..........A01n 9/00, A01n 9/22, A01n 9/24
[58] Field of Search.....................424/311, 312, 313, 424/314, 248, 266

[56] References Cited

UNITED STATES PATENTS 2,384,306   9/1945   Hester et al. .....................424/311 X
3,123,522   3/1964   Scherer et al.....................424/311 X

FOREIGN PATENTS OR APPLICATIONS 39-1948   2/1964    Japan
855,736   12/1960   Great Britain
999,876   7/1965    Great Britain Primary Examiner—Albert T. Meyers
Assistant Examiner—Allen J. Robinson
Attorney—Bacon & Thomas

[57] ABSTRACT

Nematodes and fungi in the soil may be controlled by 2-butyl-4,6-dinitrophenols and their carboxylic or carbonate esters.

8 Claims, No Drawings

METHODS OF CONTROLLING NEMATODES USING 2-BUTYL-4,6-DINITRO-PHENOL CARBOXYLIC ESTERS

This invention relates to a method of treating soil for the control of pests, particularly nematodes and fungi and to compositions therefore.

Certain species of nematodes, for example, root knot nematodes, do serious damage to agricultural and horticultural crops by attacking and feeding on the roots thereof. Among the crops that may be effected are alfalfa, beans, cucumber, cotton, peas, potatoes, sugar beet and wheat. It has now been found that a number of substituted phenols and their derivatives are highly toxic to soil-living nematodes and may be used for their control.

According to the invention, therefore, there is provided a method of treating soil for the control of nematodes and/or fungi which comprises applying thereto an effective amount of a phenol or phenolic ester having the formula I:

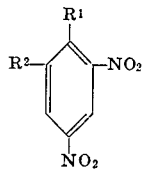

I in which $R^1$ is a hydroxyl group or a carboxylic ester or carbonate ester group
$R^2$ is a branched butyl group; and salts thereof.

$R^1$ is a hydroxyl group; or a cyclic or acylic, saturated or unsaturated (ethylenic, acetylenic or aromatic), carboxylic ester or carbonate ester group which may be substituted with one or more of the following substituents: halogen atoms, nitro groups, amino groups substituted amino groups, hydroxyl groups, carboxyl groups, carboalkoxy groups, alkoxy groups and alkylthio groups.

The carboxylic ester group may, for example, be an aromatic ester group (e.g., six membered monocyclic) substituted if desired by nitro or alkyl groups, or a heterocyclic ester group (e.g., six membered monocyclic) including oxygen, nitrogen or sulphur hetero-atoms.

Preferably the group $R^1$ has not more than 11 carbon atoms and is suitably a straight chain alkanoate group such as acetate, propionate, hexanoate, octanoate or nonanoate, or an alkenoate group having from three to 18 carbon atoms, such as acrylate, crotonate, sorbate or oleate. Alternatively, $R^1$ may be a mono- or polyhalogenated alkanoate or alkenoate group suitably having two–14, e.g., two–four, carbon atoms such as chloroacetate, bromoacetate, iodoacetate, 2- or 3-chloropropionate, 2,2-dichloropropionate or 2-chlorobutyrate. $R^1$ may also be the group $R^3$O.CO.(CH_2)_n.CO.O$ or $R^3O.CO.CH=CH.CO.O$ where $R^3$ is an alkyl group having not more than 10 carbon atoms e.g. methyl or 2-$R^2$-4,6-dinitrophenyl, and $n = 0$, or an integer from 1 to 6, e.g. 1 or 2.

Alternatively, $R^1$ may be a group of the formula $OCO.OR^4$ where $R^4$ is an alkyl, alkenyl or alkynyl group containing up to 11 carbon atoms.

Although $R^2$ may be any branched butyl group it is preferably a tertiary butyl group.

The compounds of formula I are suitably applied to the soil at a rate of from 1.12 to 56 kg/ha. However, good control of nematodes is often obtained at rates of from 2.24 to 11.2 kg/ha.

The compounds may conveniently be formulated as granules or powders containing an inert solid diluent such as Fuller's earth impregnated with the toxicant of formula I; such formulations may contain from one to 50 wt percent of the toxicant, or more or less, and may be applied to the soil in any suitable manner. It will be understood that a more effective nematicidal action will generally result when the formulation is physically mixed with the topsoil, such as by harrowing.

Alternatively, the compounds of formula I may be applied to the soil as a drench — that is, a solution or dispersion of the toxicant in a solvent or liquid diluent, suitably water. Such drenches may be prepared by diluting with water a concentrate containing the toxicant, an emulsifying agent and preferably an organic solvent such as naphtha.

Accordingly, the invention further provides a composition for application to the soil for the control of nematodes and/or soil fungi comprising a compound of formula I and a carrier or diluent.

It has further been found that compounds of formula I may exert a useful fungicidal effect, especially when applied to the soil at rates of the order of 5.6 – 56 kg/ha particularly against the soil fungi Pythium (e.g., on cotton), Rhizoctonia (e.g., on cotton) and Verticillium (e.g., on tomato).

Some compounds of the formula I, and methods of preparing them, are disclosed in British Pat. Nos. 999,876, 855,736, and 1,019,451. The compounds of formula I not disclosed in these patents may be prepared by analogous methods.

The invention is described by way of illustration only in the following Examples.

EXAMPLE 1

The following compounds of formula I were prepared (Table I) in which $R^2 =$ tert. butyl.

TABLE I

| $R^1$ | Description, solvent of crystallization | M.P., degrees | $n_D^{20}$ | Molecular formula | Analysis, percent Found Br | Found N | Required Br | Required N |
|---|---|---|---|---|---|---|---|---|
| n-Valerate | Cream prisms, ethanol | 50.5–51.5 | | $C_{15}H_{20}N_2O_6$ | | 8.6 | | 8. |
| 3-chloropropionate | White plates, propan-2-ol | 85–86 | | $C_{13}H_{15}N_2O_6Cl$ | | 8.5 | | 8.5 |
| n-Heptanoate | White prisms, methanol | 31–32 | | $C_{17}H_{24}N_2O_6$ | | 8.1 | | 7.95 |
| Decanoate | Ethanol | 40 | | $C_{20}H_{30}N_2O_6$ | | 6.7 | | 7.1 |
| Undecanoate | Methanol | 42 | | $C_{21}H_{32}N_2O_6$ | | 6.6 | | 6.9 |
| Bromoacetate | White prisms, ethanol | 70–75 | | $C_{12}H_{13}BrN_2O_6$ | | 7.7 | | 7.8 |
| Iodoacetate | Pale yellow prisms, ethanol | 81.5–83 | | $C_{12}H_{13}IN_2O_6$ | | 6.7 | | 6.9 |
| Dichloroacetate | White prisms | 64.5–66.5 | | $C_{12}H_{12}Cl_2N_2O_6$ | | 7.9 | | 8.0 |
| 2-bromopropionate | White needles, propan-2-ol | 78–79 | | $C_{13}H_{15}BrN_2O_6$ | | 8.0 | | 7.5 |
| 2,2-dichloropropionate | White prisms, light petroleum | 101–102 | | $C_{13}H_{14}Cl_2N_2O_6$ | | 7.9 | | 7.7 |
| 2,2-dibromopropionate | do | 103–104 | | $C_{13}H_{14}Br_2N_2O_6$ | | 6.4 | | 6.2 |
| 2-chlorobutyrate | do | 53–54 | | $C_{14}H_{17}ClN_2O_6$ | | 8.0 | | 8.1 |
| 2-bromobutyrate | do | 72–73.5 | | $C_{14}H_{17}BrN_2O_6$ | | | | |
| 2,3-dibromobutyrate | White prisms, methanol | 108 | | $C_{14}H_{16}Br_2N_2O_6$ | | 7.1 | | 7.2 |
| Pent-4-enoate | Yellow oil | | 1.5352 | $C_{15}H_{18}N_2O_6$ | | 8.6 | | 8.75 |
| Oleate | Orange oil | | 1.5038 | $C_{28}H_{44}N_2O_6$ | | 5.8 | | 5.6 |
| 8,9-dibromostearate | Brown oil | | 1.5280 | $C_{28}H_{44}Br_2N_2O_6$ | 24.3 | | 24.1 | |
| Nicotinate | Cream coloured needles, methanol | 161–162 | | $C_{16}H_{15}N_3O_6$ | | 8.7 | | 8.7 |
| 4-morpholinoformate | Brown prisms | 135 | | $C_{15}H_{19}N_3O_7$ | | 8.0 | | 7.9 |

Compounds of formula I in which $R^2$ = tert. butyl were evaluated for the control of root knot nematodes (Meliodogyna spp.) on cucumbers. The compounds were applied by soil incorporation to a depth of 10–15 cm just before planting.

The effectiveness of each compound was assessed at application rates of 22.4, 11.2 and 5.6 kg/ha and is indicated, in Table II below, on an arbitrary scale running from 5 (100 percent control) to 1 (no control).

TABLE II

| $R^1$ | Rating at 22.4kg/ha | 11.2kg/ha | 5.6kg/ha |
|---|---|---|---|
| acetate | 5 | 4 | 3 |
| propionate | 5 | 5 | 5 |
| butyrate | 5 | 4 | 3.5 |
| isobutyrate | 5 | 5 | 3 |
| valerate | 5 | 5 | 4 |
| hexanoate | 5 | 5 | 4 |
| octanoate | 4 | 4 | 3 |
| acrylate | 4 | 5 | 5 |
| methacrylate | 4 | 3 | 1 |
| crotonate | 5 | 5 | 4 |
| pent-4-enoate | 5 | 5 | 5 |
| chloroacetate | 5 | 5 | 5 |
| iodoacetate | 5 | 5 | 4 |
| 2-chloropropionate | 5 | 5 | 4 |
| 3-chloropropionate | 5 | 5 | 4 |
| 2,2-dichloropropionate | 5 | 4 | 5 |
| 2-bromo-n-butyrate | 5 | 5 | 5 |

EXAMPLE 2

Compounds of formula I in which $R^2$ is tert. butyl and $R^1$ is a carbonate group were tested for activity against root knot nematodes (Meliodogyna spp) by the procedure of Example 1. The rates of application were 3.36, and 2.24 kg/ha and three replications were carried out at each rate of application. The effectiveness was assessed as in Example 1. The results are shown in Table III.

TABLE III

| $R^1$ | Rating at 3.36kg/ha | 2.24kg/ha |
|---|---|---|
| methyl carbonate | 3 | 3 |
|  | 4 | 2 |
|  | 3 | 3 |
| allyl carbonate | 4 | 3 |
|  | 3 | 3 |
|  | 4 | 4 |
| 2-chloroethyl carbonate | 5 | 4 |
|  | 4 | 4 |
|  | 4 | 1 |
| 2-ethoxyethyl carbonate | 4 | 3 |
|  | 5 | 3 |
|  | 4 | 3 |
| propargyl carbonate | 4 | 4 |
|  | 4 | 5 |
|  | 4 | 3 |
| 1-ethoxycarbonyl ethyl carbonate | 4 | 4 |
|  | 3 | 3 |
|  | 4 | 4 |
| untreated control | 1 | 1 |
|  | 1 | 1 |
|  | 1 | 1 |

EXAMPLE 3

The nematode Panagrellus was cultured on an oatmeal medium. The nematodes, of all age groups, were suspended in water to form a concentrated suspension and 1 ml. of this suspension was added to an aqueous medium containing one of a number of compounds of formula I at a concentration of 500 p.p.m. This diluted suspension was then further diluted as required to give concentrations of toxicant of 300, 100 and 30 p.p.m.

After 48 hours, the dead and live nematodes were counted visually under a microscope (3 field × 80 magnification). The percentage control was then assessed, after allowing for natural mortality.

In the compounds used, $R^2$ = tert. butyl and $R^1$ = carboxylic ester, or hydrogen. The results are shown in Table IV.

A test was also carried out using 2-sec.butyl-4,6-dinitrophenyl n-heptanoate; the percent control at 300, 100 and 30 ppm was 80, 50 and 0 percent respectively,

TABLE IV

| $R^1$ | % Control at (ppm) 300 | 100 | 30 |
|---|---|---|---|
| Acetate | 100 | 80 | 40 |
| Hexanoate | 65 | 50 | 10 |
| Heptanoate | 80 | 10 | 5 |
| Octanoate | 85 | 40 | 15 |
| Nonanoate | 100 | 100 | 35 |
| Undecanoate | 100 | 100 | 20 |
| Chloroacetate | 100 | 100 | 100 |
| Bromoacetate | 100 | 95 | 90 |
| Iodoacetate | 100 | 100 | 70 |
| 2-Chloropropionate | 100 | 90 | 70 |
| 3-Chloropropionate | 100 | 100 | 100 |
| 2-Bromopropionate | 100 | 100 | 100 |
| 2,2-Dichloropropionate | 100 | 100 | 100 |
| 2,2-Dibromopropionate | 100 | 100 | 70 |
| 2-Chlorobutyrate | 100 | 100 | 30 |
| 2-Bromobutyrate | 70 | 30 | 0 |
| 2,3-Dibromobutyrate | 100 | 90 | 25 |
| Isobutyrate | 100 | 35 | 5 |
| Acrylate | 100 | 100 | 20 |
| Crotonate | 100 | 90 | 20 |
| Pent-4-enoate | 95 | 90 | 40 |
| 9,10-Dibromostearate | 85 | 40 | 5 |
| p-Nitrobenzoate | 90 | 75 | 50 |
| Nicotinoate | 100 | 75 | 5 |
| Hydroxyl | 100 | 95 | 80 |
| 2-tert-butyl-4,6-Dinitrophenyl oxalate | 100 | 100 | 60 |

EXAMPLE 4

Compounds of formula I in which $R^2$ = tert. butyl were tested for activity against stem nematodes (Ditylenchus dipsaci). The compounds were applied by soil incorporation just before planting seeds of the test plant, alfalfa. All tests were performed with three replications. The test plants were assessed for disease two weeks after planting, and the nematicidal activity of the compound being tested was related to the following scale:

5 = complete control
4 = slight disease
3 = moderate disease
2 = moderately severe disease
1 = severe disease (no control)
(−5) = plant dead The results are shown in Table V.

TABLE V

| $R^1$ | Activity Rating at 11.2kg/ha | 5.6kg/ha | 2.8kg/ha |
|---|---|---|---|
| acetate | 1 | (−5) | 1 |
|  | 5 | (−5) | 1 |
|  | 5 | 2 | 1 |
| crotonate | 5 | 4 | 5 |
|  | 4 | (−5) | 2 |
|  | 5 | 3 | 1 |
| iodoacetate | (−5) | (−5) | 5 |
|  | (−5) | (−5) | 5 |
|  | (−5) | 5 | 2 |
| 2-chloropropionate | — | 5 | 3 |
| 2,2-dichloropropionate | (−5) | 5 | 2 |
|  | (−5) | (−5) | 5 |
|  | (−5) | (−5) | 1 |
| methyl carbonate | 5 | 1 | 1 |
|  | 5 | 1 | 1 |
|  | 5 | 1 | 1 |
| 1-ethoxycarbonylethyl carbonate | 5 | 1 | 5 |
|  | 5 | 5 | 5 |
|  | 5 | 5 | 1 |

|  |  |  |  |
|---|---|---|---|
| propargyl carbonate | 5 | 5 | 2 |
|  | 1 | 1 | 5 |
|  | 1 | 2 | 1 |
| untreated control | 1 | 1 | 1 |
|  | 1 | 1 | 1 |
|  | 1 | 1 | 1 |

EXAMPLE 5

Compounds of the formula I were tested for activity aganist root knot nematodes (Meliodogyna spp) and stem nematodes (*Ditylenchus dipsaci*).

The compounds were applied by soil incorporation just before planting seeds of the test plants (cucumber for root knot nematode, and alfalfa for stem nematode). The test plants were assessed for disease incidence two weeks after planting.

The effectiveness of each compound is indicated in Table VI on an arbitrary scale running from 5 (100 percent control) to 1 (No control of disease), while (—) indicates that the plant died or was severly injured and a reading was not possible.

TABLE VI

| Ester of 2-tert. butyl-4,6-dinitrophenol | Activity Rating | |
|---|---|---|
|  | Root nematode 22.4 kg/ha | Stem nematode 44.8 kg/ha |
| Fumarates: | | |
| n-Pentyl | 5 | 3 |
| n-Hexyl | 4 | (—) |
| n-Octyl | 5 | 5 |
| n-Undecyl | 5 | (—) |
| 2-tert. butyl-4,6-dinitrophenyl | 5 | 4 |
| Succinates: | | |
| Ethyl | 5 | 5 |
| Adipates: | | |
| Ethyl | 5 | 1 |
| 2-tert. butyl-4,6-dinitrophenyl | 4 | 1 |

EXAMPLE 6

Some of the compounds used in Example 1 were tested for activity against soil fungi at rates of 22.4, 11.2 and 5.6 kg/ha. The three fungi used were Pythium (on cotton), Rhizoctonia(on cotton) and Verticillium(on tomato). The results, shown in Table VII below, are expressed in terms of an arbitary scale on which 5 represents no disease, 4 = slight disease, 3 = moderate disease, 2 = moderately severe disease and 1 = severe disease.

TABLE VII

| $R^1$ | Pythium spp. | | Rhizoctonia solani | | Verticillium albo-atrum | |
|---|---|---|---|---|---|---|
|  | 22.4 kg/ha | 11.2 kg/ha | 5.6 kg/ha | 22.4 kg/ha | 11.2 kg/ha | 11.2 kg/ha | 5.6 kg/ha |
| acetate | 5 | 4 | — | 2 | 2 | 3 | 3 |
| n-butyrate |  |  | — |  | 5 |  |  |

|  |  |  |  |  |  |  |
|---|---|---|---|---|---|---|
| n-octanoate |  |  | 5 | 4 |  |  |
| acrylate | 5 | 5 | 5 3 | 3 | 1 | 1 |
| methacrylate |  |  | 4 | 3 |  |  |
| chloroacetate | 5 | 5 | 1 5 | 5 | — | 3 |
| 3-chloropropionate | 5 | 5 | 3 5 | 5 | 5 | 1 |

I claim:

1. A method for controlling the nematode population in agricultural soils which comprises contacting said nematodes with a nematicidally effective amount of a compound having the formula:

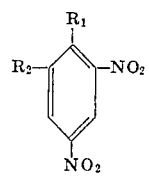

in which $R^1$ is selected from the group consisting of a straight chain alkanoyloxy group having two–11 carbon atoms, a straight chain mono- or dihalosubstituted alkanoyloxy group having two–14 carbon atoms, a straight chain alkenoyloxy group having three–18 carbon atoms, nicotinate, 4-morpholinoformate, p-nitrobenzoate, $R^3O.CO(CH_2)_nCO.O$, and $R^3O.CO.CH=CH.CO.O$, wherein $R^3$ is a straight chain alkyl group having one–10 carbon atoms or 2-$R^2$-4,6-dinitrophenyl and $n$ is selected from the group consisting of zero and integers from one–six; and $R^2$ is a branched butyl group.

2. The method as claimed in claim 1 wherein $R^1$ is selected from the group consisting of acetate, propionate, n-hexanoate, n-octanoate and n-nonanoate.

3. The method as claimed in claim 1 wherein $R^1$ is selected from the group consisting of acrylate, crotonate, sorbate and oleate.

4. The method as claimed in claim 1 wherein $R^1$ is a mono- or dihalosubstituted straight chain alkanoyloxy group having two to four carbon atoms.

5. The method as claimed in claim 4 wherein said mono- or dihalosubstituted group is selected from the group consisting of chloroacetate, bromoacetate, iodoacetate, 2- and 3-chloro-propionate, 2,2-dichloropropionate and 2-chlorobutyrate.

6. The method as claimed in claim 1 wherein $R^1$ is $CH_3O.CO.CH=CH.CO.O$.

7. The method as claimed in claim 1 wherein $R^2$ is tert. butyl.

8. The method as claimed in claim 7 wherein said phenolic ester is 2-tert-butyl-4,6-dinitrophenyl acetate.

* * * * *